Sept. 8, 1964 D. W. KING, JR., ETAL 3,148,014

MULTICHANNEL PRINTING RECORDER APPARATUS

Filed April 21, 1961 5 Sheets-Sheet 1

INVENTORS
DAVID W. KING, JR.
FREDERICK L. MALTBY

BY Wm. T. Wofford
ATTORNEY

INVENTORS
DAVID W. KING, JR.
FREDERICK L. MALTBY
BY Wm. T. Wofford
ATTORNEY

Sept. 8, 1964 D. W. KING, JR., ETAL 3,148,014

MULTICHANNEL PRINTING RECORDER APPARATUS

Filed April 21, 1961

5 Sheets-Sheet 3

INVENTORS
DAVID W. KING, JR.
FREDERICK L. MALTBY

BY Wm. T. Wofford
ATTORNEY

Sept. 8, 1964 D. W. KING, JR., ETAL 3,148,014
MULTICHANNEL PRINTING RECORDER APPARATUS
Filed April 21, 1961 5 Sheets-Sheet 4

INVENTORS
DAVID W. KING, JR.
FREDERICK L. MALTBY
BY Wm. T. Wofford
ATTORNEY

MULTICHANNEL PRINTING RECORDER APPARATUS

Filed April 21, 1961

5 Sheets-Sheet 5

INVENTORS
DAVID W. KING, JR.
FREDERICK L. MALTBY
BY Wm. T. Wofford
ATTORNEY

United States Patent Office
3,148,014
Patented Sept. 8, 1964

3,148,014
MULTICHANNEL PRINTING RECORDER APPARATUS

David W. King, Jr., Fort Worth, Tex., and Frederick L. Maltby, Abington, Pa., assignors to Westronics, Inc., Fort Worth, Tex.
Filed Apr. 21, 1961, Ser. No. 104,708
15 Claims. (Cl. 346—32)

This invention relates to recorder apparatus, and more particularly to recorder apparatus wherein information, intelligence, or data, derived from a plurality of input channels is recorded on a single moving chart. The invention is especially applicable to, but not restricted to, recorders of the null balance potentiometer type having a single recording head shared by a plurality of input channels, with the recording head printing signal information from each input channel, or from selected input channels in accordance with a selected sequence or predetermined program.

Multichannel printing recorders available in the prior art have not provided an optimum degree of satisfaction in a large number of present day applications. The need for improvements in overall design as well as the design of individual components and the interrelation of components has been strongly indicated. Accordingly, the general object of this invention is to provide an improved multichannel printing recorder capable of producing an optimum degree of satisfaction in all types of applications to which it will normally be applied.

Some of the attributes which a desirable multichannel printing recorder should possess are those of relative simplicity, reliability, economy of manufacture, and ease of maintenance. While such attributes are quite standard, they are none the less important, and it is therefore an object of the present invention to provide them.

In many modern instrumentation systems, physical space conservation is of considerable importance, and hence compactness is a desirable recorder attribute, and to achieve such compactness is another object of the present invention.

An important need at the present time, and one which appears likely to become even more important in the foreseeable future, is the need for a multichannel printing recorder which is capable of sustained high speed operation. The satisfaction of this need is to be achieved not only by the improvement of specific recorder components, but also their interrelation and interaction resulting in improved performance of the recorder as a whole. Such improvement of specific recorder components, as well as their interaction and interrelation is accordingly an important object of the present invention.

More specifically, the objects of the present invention include improvements in the recorder print head structure, print head carriage structure and arrangement, inking pad arrangement, print wheel, print head indexing mechanism, input channel and print head synchronization, and channel print inhibiting selection and arrangemet.

The foregoing and other objects are effected by the present invention as will be apparent from the following description taken in accordance with the accompanying drawings, forming a part of this application, in which.

Figures 1, 2:
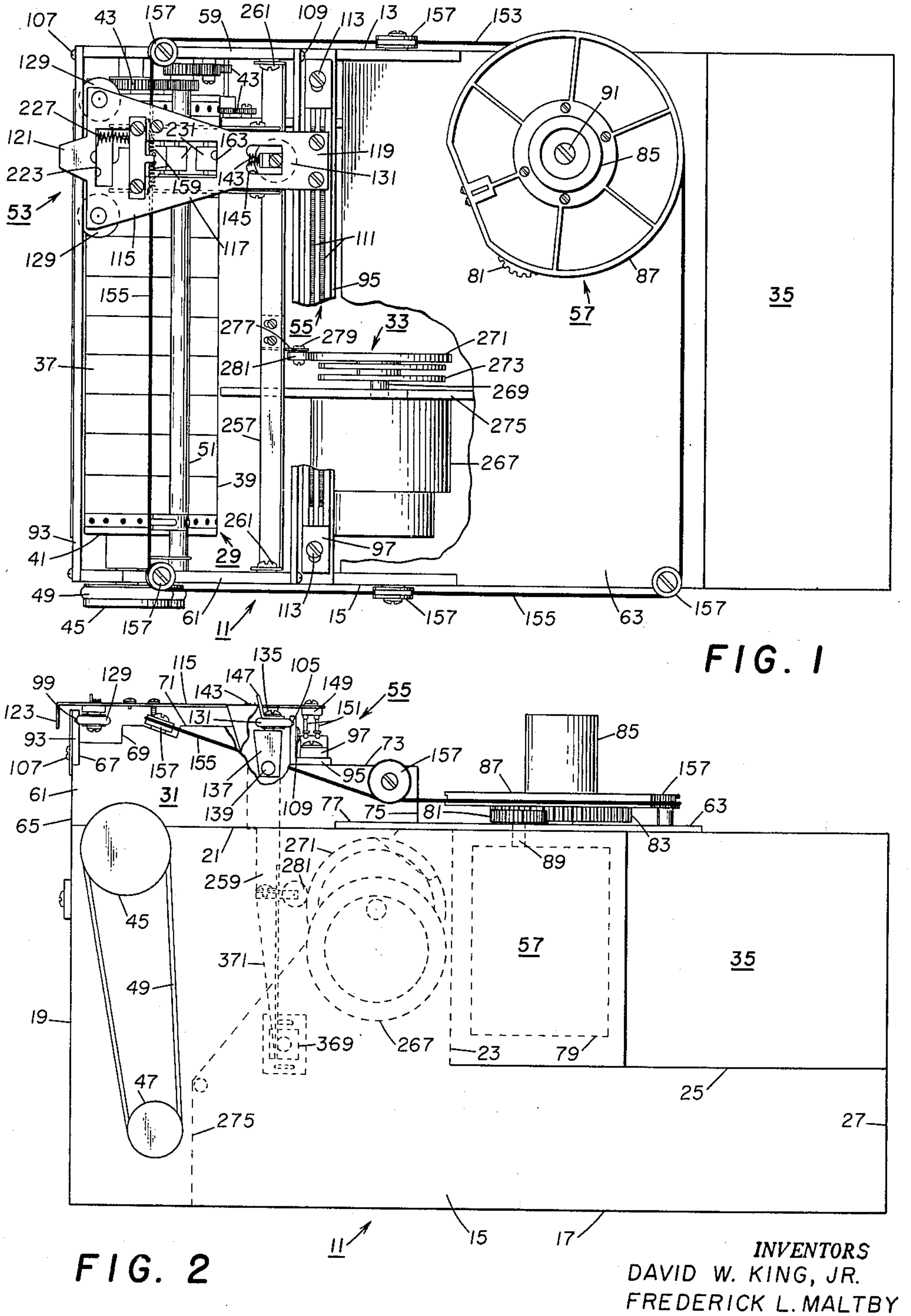
FIGURE 1 is a simplified schematic plan view showing a multichannel printing recorder in accordance with a preferred embodiment of the present invention.
FIGURE 2 is a simplified schematic side elevational view of the recorder of FIGURE 1, with some parts indicated by dotted lines.
Figures 3, 14, 16:
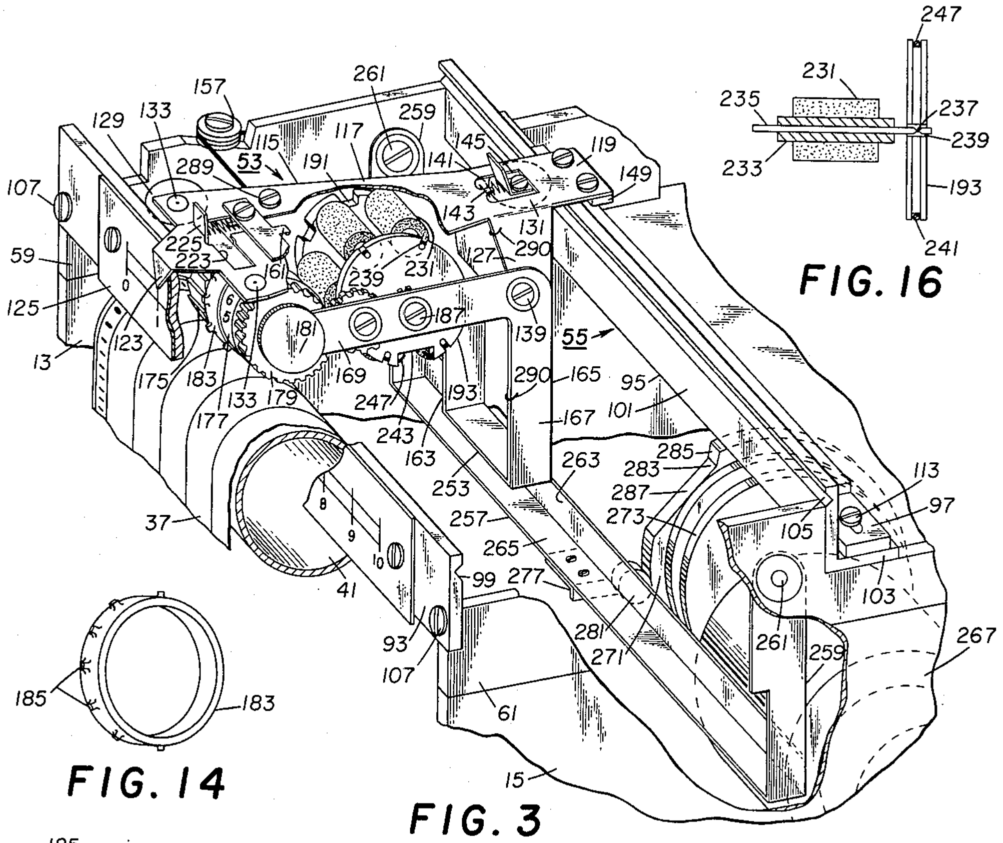
FIGURE 3 is a simplified schematic fragmentary perspective view showing primarily the print head, print head actuating mechanism, and print head carriage of the recorder of FIGURE 1, with some parts broken away.
Figure 15:
Figure 12:
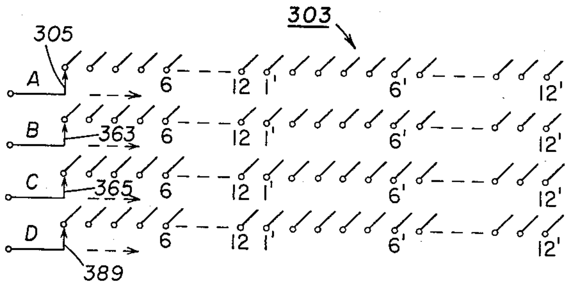
Figure 4:
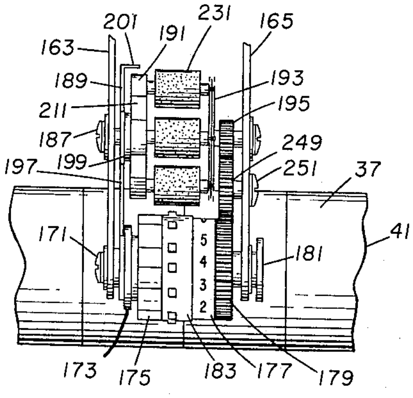
FIGURE 4 is a fragmentary plan view of the print head of FIGURE 3.
Figures 5, 6, 21:
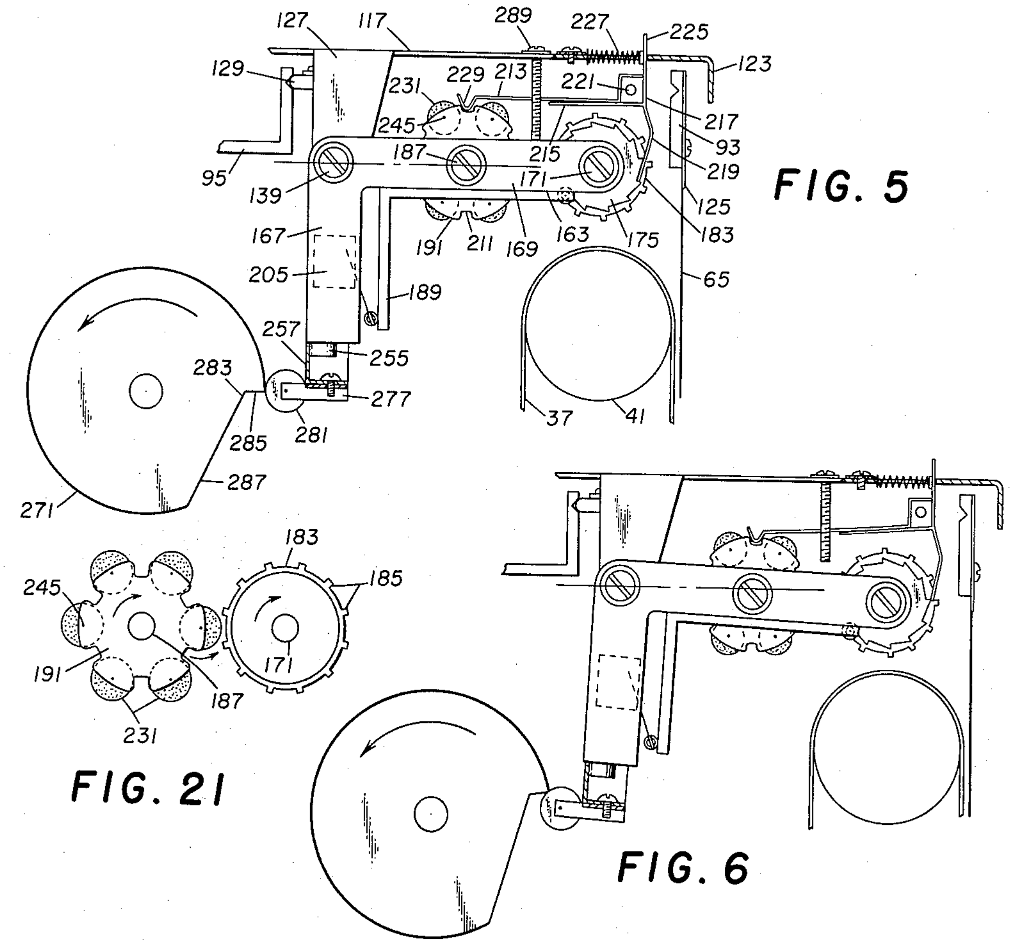
Figures 7, 8:
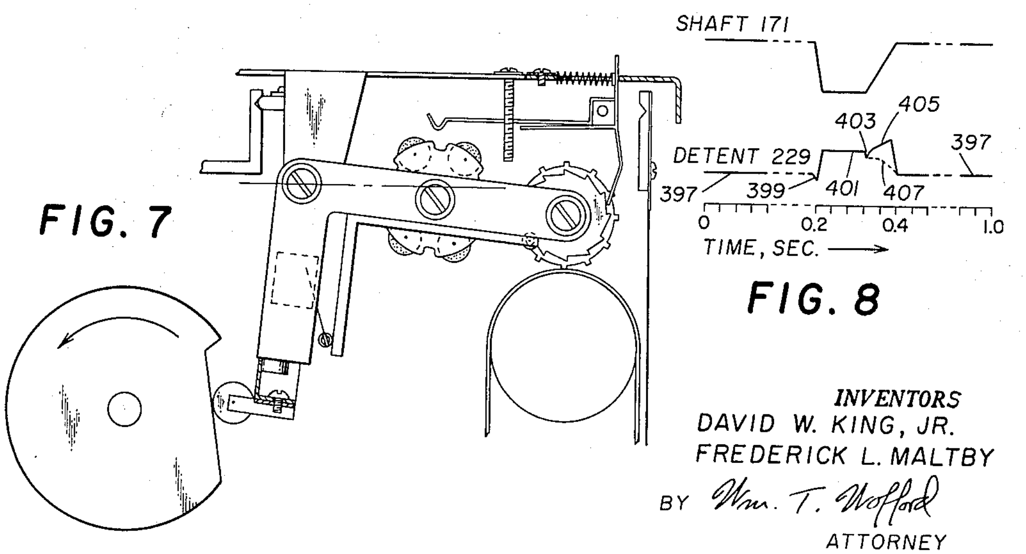
Figure 13:
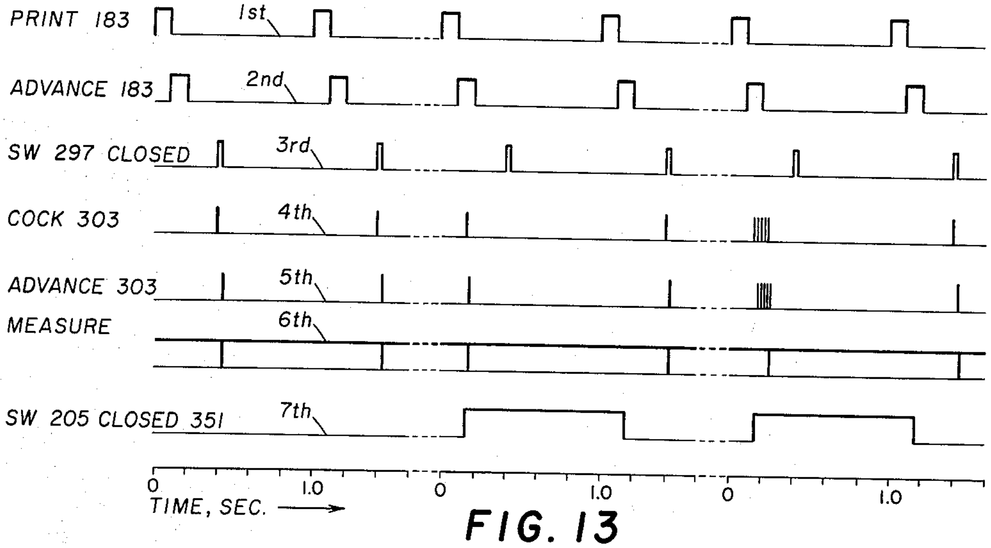
Figure 10:
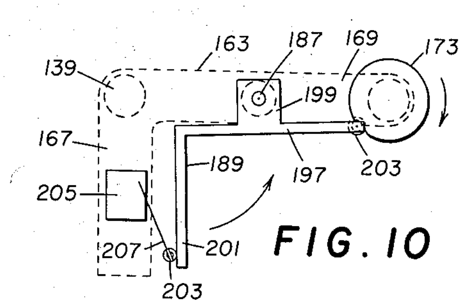
Figure 11:
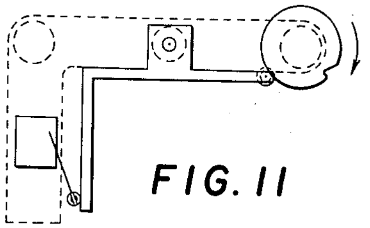
Figure 9:
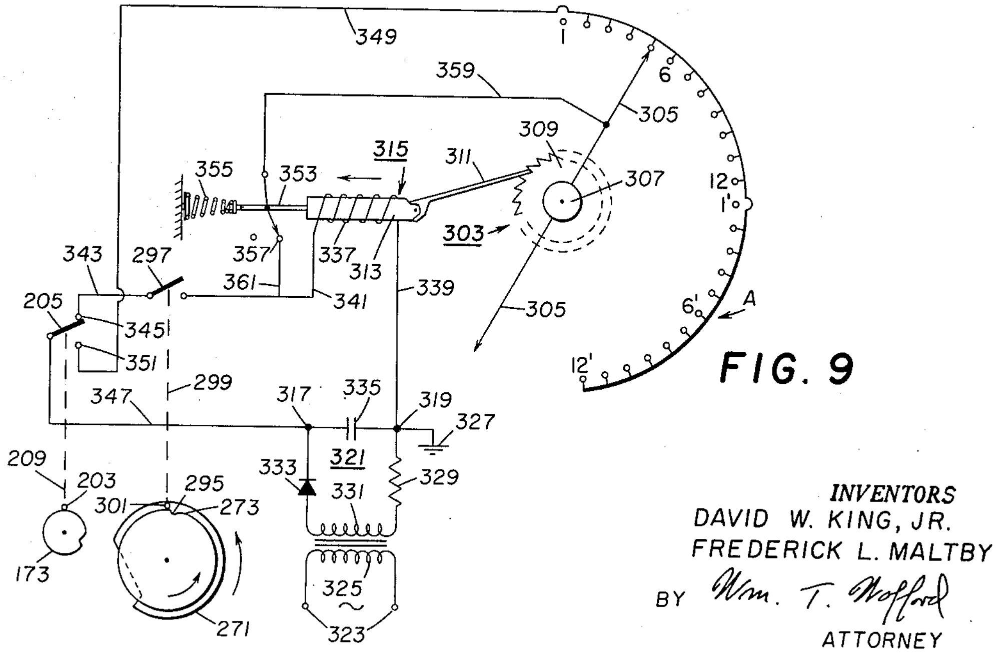
Figures 17, 18, 19, 20:
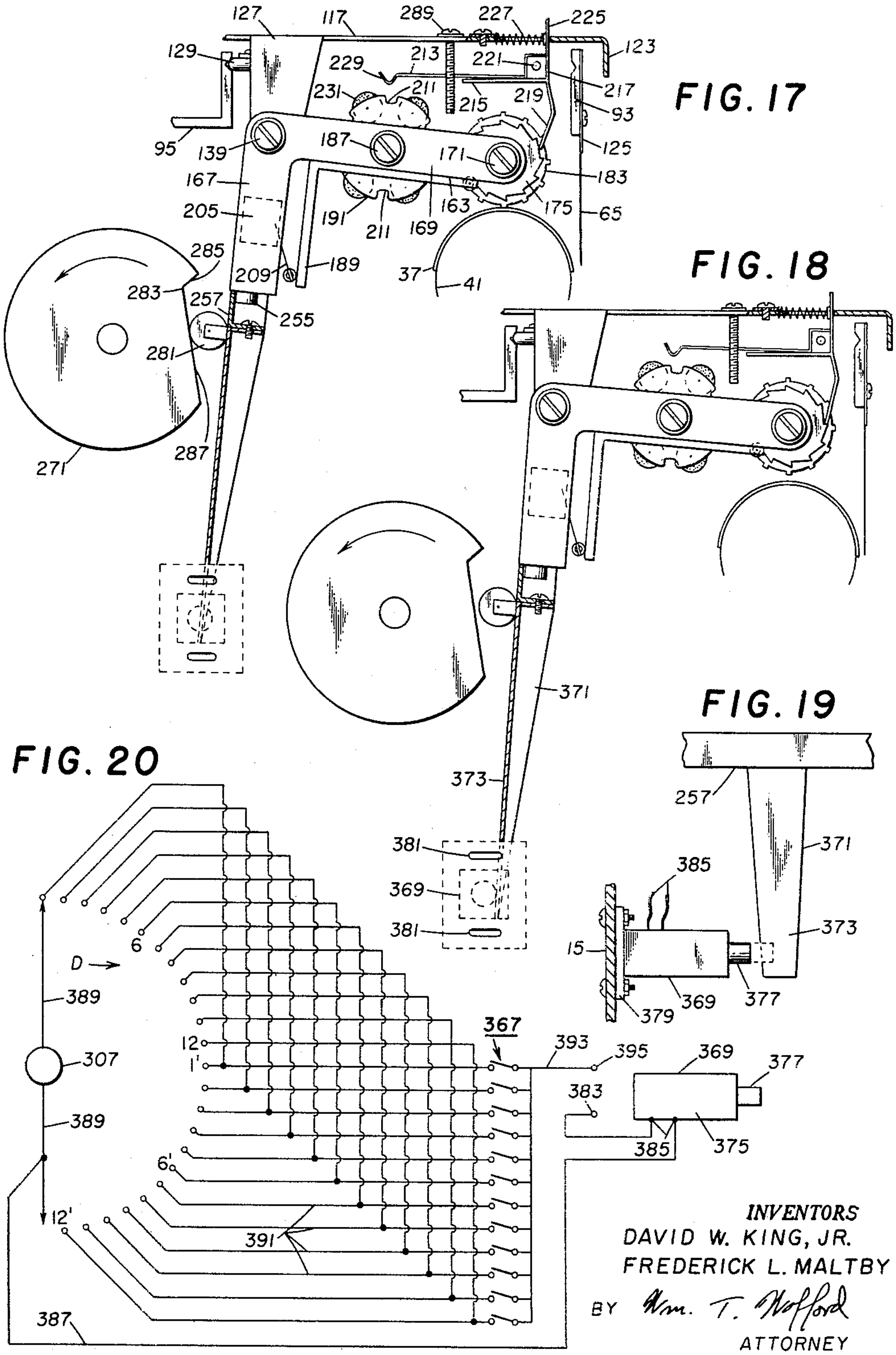

FIGURES 5, 6, and 7 are simplified schematic side elevational views illustrating the action of the print head indexing mechanism;

FIGURE 8 is a graph to aid in explanation of the operation of the print head indexing mechanism;

FIGURE 9 is a simplified schematic circuit diagram illustrating the principles of a print head to input channel synchronizing system and arrangement in accordance with the present invention;

FIGURES 10 and 11 are side elevational views illustrating operation of the print head synchronizing cam, cam follower, and switch actuator;

FIGURE 12 is a schematic showing of a multiple deck selector switch mechanism of a type utilized in some aspects of the present invention;

FIGURE 13 is a graph to aid in the explanation of the print head to channel input synchronizing system in accordance with the present invention;

FIGURE 14 is a perspective view of the print wheel character ring;

FIGURE 15 is an enlarged cross-section of the ring of FIGURE 14;

FIGURE 16 is an enlarged fragmentary view, partly in section, showing details of an inking pad spindle, shaft and bearing;

FIGURES 17 and 18 are simplified schematic side elevational views illustrating the action of the print inhibitor arrangement;

FIGURE 19 is an end elevational view further illustrating the print inhibitor arrangement;

FIGURE 20 is a simplified schematic circuit diagram illustrating the print inhibitor circuit arrangement; and, FIGURE 21 is a schematic side elevational view illustrating the interrelation between the print head inking pads and the print wheel.

Referring now to the drawings, and especially FIGURES 1–4, the multichannel printing recorder shown has a frame or chassis 11 including a left hand and a right hand sidewall 13, 15 held in rigid parallel spaced relation by suitable cross members (not shown) as well as certain other structures which will appear as this description progresses. The sidewalls are substantially identical, being simply rectangular with a little more than the upper rear quarter section removed. For convenience in locating parts, the sidewall boundaries may be designated as bottom margin 17, front margin 19, upper top margin 21, step margin 23, lower top margin 25, and rear margin 27.

The major assemblies of the recorder are the chart and chart drive assembly 29, the servo plate assembly 31, the print head actuator assembly 33, the servo amplifier assembly 35, and the stepping switch assembly 303, and the print inhibitor assembly.

The chart and chart drive assembly per se forms no part of the present invention, and so is not shown or described in detail herein. Chart paper 37 is fed from a supply roll 39 journalled to the sidewalls 13, 15 at their front center portions, upward and over a print platen 41 journalled to the sidewalls at their upper front portions, then down and onto a storage spool (not shown) journalled to the sidewalls at their lower front portions. The supply roll 39 is free to turn, while the print platen 41 is driven at a selected contant rate through a gear train 43 by a conventional motor (not shown). The print platen shaft and the storage spool shaft each protrude through the right sidewall to its exterior where each mounts a respective pulley 45, 47. A spring belt 49 drives the storage spool at an appropriate speed proportional to that of the print platen. The chart paper 37 is driven by the usual radial projections on the print platen end portions which cooperate with marginal lines of spaced holes in the chart paper. A back-up rod 51 is fixed to the sidewalls 13, 15 and extend parallel to the print platen 41 and adjacent its lower rear surface, to keep the chart paper snug against the print platen.

The servo plate assembly 31 includes a print head and print head carriage assembly 53, a carriage track and slide wire assembly 55, and a servo motor drive assembly 57.

The support structure for the servo plate assembly 31 includes a pair of substantially identical sidewall extension members 59, 61, a rectangular deck plate 63, and a support housing (not shown). The sidewall extensions 59, 61 are basically rectangular except that they have a stepped top margin and a re-entrant notch at their lower rear portions. For convenience, the sidewall extension boundaries are designated as the front margin 63, a first step up 67, a second step up 69, top margin 71, step down 73, rear margin 75, and re-entrant notch 77. The deck plate length is the same as the distance between the sidewall exteriors, and in assembly, the deck plate 63 is horizontal and its front portion rests upon the rear portion of the upper top margin 21 of the sidewalls 13, 15, filling the re-entrant notches 77 of the sidewall extensions 59, 61. The sidewall extensions are fixed first to the deck plate and then to the sidewalls. The support housing (not shown) has a rear wall, sidewalls, and a bottom, and depends from the deck plate, being fixed thereto by means of rear wall and sidewall flanges. The support housing extends nearly the length of the deck plate, but leaving some clearance at each end. The support housing bottom is supported on the sidewalls by suitable brackets (not shown).

The servo motor drive assembly 57 includes a servo motor 79 having an output pinion 81 driving a bull gear 83 fixed to a hub 85 which also carries a bull wheel 87. The servo motor is of a conventional type commonly used with null-balance type potentiometer recorders, and is mounted on the support housing with its output shaft 89 extending vertically upward through the deck plate 63 so that its output pinion 81 is exposed immediately above the deck plate. A stub shaft 91 is fixed to the deck plate and extends upwardly therefrom, with the bull gear and bull wheel hub 85 journalled on it. The stub shaft 91 is located so that the servo motor output pinion 81 engages the bull gear 83 in driving relation. The bull wheel 87 serves to drive the print head carriage as will be hereinafter more fully explained.

The servo amplifier assembly 35 may be of any conventional type commonly used in null balance type potentiometer recorders, and since it per se forms no part of the present invention, it is not shown and described in detail herein. The amplifier assembly is mounted as a unit on the lower top margin of the sidewalls and occupies the space generally designated by the reference numeral 35.

The carriage track and slidewire assembly 55 includes a front track 93, a rear track 95, and a slidewire base 97. The front track is simply a length of metal bar stock of rectangular transverse section, having planar front and rear faces, with a linear V groove 99 extending the length of the rear face parallel to and adjacent the upper edge thereof. The rear track is a length of right angle bar stock with a vertical side 101 having parallel planar front and rear faces and a horizontal side 103 having parallel planar upper and lower faces. The vertical side has a V groove 105 extending the length of its front face parallel to and adjacent the upper edge thereof. The length of the tracks 93, 95 is the same as the distance between the exterior surfaces of sidewall extensions 59, 61. The front track is mounted on the sidewall extensions, filling the first step up 67 thereof, and with its front face flush with the front margins 65 of the sidewall extensions. The front track 93 is rigidly secured to the sidewall extensions by means of screws 107. The rear track 95 is mounted on the sidewall extensions with the lower portion of its vertical side front face and the horizontal side lower face abutting the sidewall extension step down 73. The rear track is rigidly secured to the sidewall extensions by means of screws 109. With the front and rear tracks thus mounted and secured, the lines of the apices of the V grooves 99, 105 of the tracks lie in a common (substantially horizontal) plane, are parallel, and are spaced apart a sufficient distance to accommodate cooperating parts of the print head carriage. The slidewire base 97 is a strip of suitable insulating material having parallel planar upper and lower faces. A pair of parallel spaced slidewires 111 are partially imbedded in and fixed to the upper side of the base 97. The base 97 rests on the upper face of the horizontal side 103 of the rear track 95, and is fixed thereto by screws 113. The base 97 is so disposed as to make the slidewires 111 parallel to the track V grooves 99, 105. The slidewires are of length just greater than the carriage travel, and leads (not shown) are brought out at each end of each slidewire. The slidewires are of a conventional type wherein fine resistance wire is closely wound on an insulated core rod.

The print head carriage includes a main support member 115 in the form of a heavy gauge metal stamping having the shape of an isosceles trapezoid 117 with an integral rectangular extension 119 having a short side merging with the short base of the trapezoid and having an integral extension in the form of a small isosceles triangle 121 having its base merging with the long base of the trapezoid at the central portion thereof and having its apex portion turned down at right angles to the rest to form an indicator pointer 123. This indicator pointer 123 cooperates with an indicator scale 125 which is fixed to the front face of the front track. A pair of integral ears oppositely disposed with their base margins merging with the rectangle long sides adjacent the trapezoid end have been turned down at right angles to the rectangle surface to form parallel spaced depending pivot support arms 127. One important function of the carriage main support member is to carry the carriage rollers. The carriage is provided a three point roller suspension wherein there are two fixed rollers 129 and one pivoted roller 131. The two fixed rollers 129 are journalled on respective stub shaft 133 which are fixed to the long base corner portions of the trapezoid 117 and depend therefrom, with the fixed rollers riding in the V groove 99 of the front track 93. The pivoted roller 131 is journalled on a stub shaft 135 which is fixed to and extends outwardly from one end of a pivot block 137 which is pivoted adjacent its other end on a transverse pivot shaft 139 which is carried by the depending pivot support arms 127 of the main support member 115. The pivot block 137 extends upwardly from the pivot shaft 139, allowing the pivoted roller 131 to ride in the V groove 105 of the rear track 95. The pivoted roller 131 is spring biased into contact with the V grooves 105 by means of a compression spring 141 having one end held by a tongue 143 formed in an opening 145 at the central portion of the main support member rectangular portion 119, and the other end held by a tab 147 which is fixed to the upper end of the pivoted roller stub shaft 135 and extends upwardly therefrom through and beyond the said opening 145. The free end portion of the rectangular portion 119 of the carriage main support member 115 extends rearwardly beyond the rear track 95 and above the slidewires 111. An insulator block 149 is fixed to the underside of main support member 115 directly above the slidewires 111. The insulator block 149 carries a pair of depending slider contacts 151 which act as a moveable shunt across the slidewires.

The print head and carriage assembly 53 is pulled in either direction along the tracks 93, 95 by means of a pair of flexible cable threads 153, 155. The cable threads are fixed at one end to the bull wheel 87 and extend in opposite directions partway around the bull wheel and then tangentially away from its and over suitable guide rollers 157 to dead end each on one end of a respective tension spring 159 which is fixed at its other end to a depending tab 161, which in turn is fixed to the carriage main support member 115 and extends downwardly adjacent the forward end of a rectangular opening 163 therein. The springs 159 serve to keep the cable threads 153, 155 sufficiently taut for effective action.

The print head includes a pair of spaced parallel and juxtaposed bell crank levers 163, 165 made from heavy gauge metal sheet material. The bell crank levers are for convenience designated as the left hand lever 163 and the right hand lever 165, and each has a short arm 167 and a long arm 169. The levers 163, 165 are pivoted at the junctures of their respective arms on the transverse pivot shaft 139 carried by the depending pivot support arms 127 of the carriage main support member 115, the levers being disposed outboard of the support arms. The lever short arms 167 extend downwardly from the pivot shaft 139, while the lever long arms 169 extend forwardly of the pivot shaft 139. A lever front shaft 171 is journalled on the long arms 169 adjacent their outer ends and extends parallel to the lever pivot shaft 139.

Keyed to said front shaft between said long arms and so as to rotate with said shaft are a print head cam 173, a ratchet wheel 175, a print character ring support disc (not shown), a channel indicator disc 177, and a front gear 179, arranged in that order reading from left lever 163 to right lever 165. Also fixed to the front shaft 171 but outboard of the right long arm 169 is a thumb wheel 181, provided for convenient manual rotation of the front shaft 171. A print character ring or band 183 as shown by FIGURE 14 is mounted on the ring carrier disc. This print character ring 183 is made of a resilient ink adsorptive material such as rubber, and will fit snugly on the carrier disc without creeping. The transverse section of the print character ring is indicated by FIGURE 15, with the protruding portion 185 representing a character. The print character disc and ring together make up the print wheel. There is a character (usually a numeral) on the print character ring 183 for each recorder channel, and a tooth on the ratchet wheel 175 for each recorder channel. The characters printed on the channel indicator disc 177 are the same as those on the print character ring, except they are displaced so that when a particular channel character is printing, the indicator disc will read that channel from a convenient viewing position (usually the front center position).

The print head cam 173 has a single dwell position corresponding to the print character ring position when the reference (usually the first) channel is in position for printing, for a purpose to be hereinafter explained. The print head cam 173 has an integral reduced diameter portion on each side, providing side celarance so that a cam follower may have flanges to keep it confined to the cam periphery. It should be noted that the print head cam 173 and inking pad support disc 193 have been omitted in FIGURES 5, 6, 7, 17 and 18 to improve their clarity.

A lever rear shaft 187 is journalled on the long arms 169 near their center portions and extends parallel to the lever pivot shaft 139. Keyed to the said rear shaft between said long arms, and so as to rotate with said shaft, are a cam follower lever 189, a detent wheel 191, an inking pad support disc 193, and a rear gear 195, arranged in that order reading from left lever 163 to right lever 167.

The cam follower lever 189 has a pivoted leg 197 with a pivot ear 199 projecting upwardly therefrom slightly to the rear of center, and an actuator leg 201 depending from the pivoted leg 197 at high angles thereto. The pivoted ear 199 is journalled on the rear shaft 187. A cam follower in the form of a roller 203 is journalled on a stub shaft which is fixed adjacent the pivoted leg outer end and extends inboard therefrom. The stub shaft has a roller retainer flange at its outer end. The cam follower roller 203 rides on the print head cam 173 periphery, with the retainer flange and the outer end portion of the pivoted arm acting as guides. The function of the cam follower 189 is to actuate a first microswitch 205 when the follower moves in or out of the dwell position for a purpose to be hereinafter explained. The first microswitch 205 is fixed to the inner side of the short arm 167 of the left hand print head lever 163 in position such that roller 207 of the switch actuator arm 209 bears on the actuator leg 201 of the cam follower 189. The microswitch 205 is a single pole double throw type and is spring biased toward the closed position of one of its contacts, so that it automatically actuates to the closed position of that contact when the cam follower 189 dwells, but is forced by the cam follower actuator leg to the closed position of the other one of its contacts when the cam follower does not dwell.

The detent wheel 191 has a number of depressions 211 equal to one half the number of recorder channels. The detent wheel is a part of the print head index locking mechanism and is designed to cooperate with a detent arm 213 in the form of a spring leaf. The detent arm is fixed to the upper side of the rearward arm 215 of an index locking mechanism right angle bell crank 217 adjacent the pivot end of said rearward arm 215. The other arm of the index locking mechanism bell crank forms a pawl 219 which cooperates with the print head ratchet wheel 175. The index locking mechanism bell crank 217 is pivoted on a shaft 221 which is journalled on depending ears (not shown) turned down from the carriage main support member 115, leaving a transverse generally rectangular opening 223 therein. The pivot shaft 221 of the bell crank 217 extends parallel to the print head front shaft 171, and is located between the fixed carriage rollers 129 and slightly rearward of same. A tab 225 fixed relative to the bell crank pivot shaft 221 extends upwardly through said transverse rectangular opening 223. The bell crank 217 is spring biased in a direction so as to urge the pawl 219 into contact with the ratchet wheel 175. This bias is accomplished by a compression spring 227 bearing at one end on a depression in the rearward side of said transverse rectangular opening 223 and at the other end on said tab 225, with the forward side of said opening 223 serving as a limit stop for said tab. The free end portion of the detent arm 213 is shaped to form a detent 229 designed to cooperate with the peripheral surface of the detent wheel 191.

There are provided a number of inking pads equal to one half the number of print head characters. Each inking pad 231 is a spool of suitable ink absorbent material, such as felt or the like, and is mounted on a bearing sleeve 233, which is mounted for rotation on a bearing shaft 235 which is longer than the sleeve. Each inking pad bearing shaft 235 is provided with a circumferential groove 237 adjacent one end thereof, for a purpose to be hereinafter explained.

The inking pad support disc 193 is provided with a number of shallow radially extending slots 239 in its peripheral portion. These slots are equally spaced about the disc circumference and are each designed to receive and support one end of a respective inking pad bearing shaft 235. The inking pad support disc 193 is also provided with a circumferential channel 241 formed in its peripheral surface and of depth slightly less than that of said slots 239. The support disc 193 is further provided with a rectangular notch 243 in its peripheral portion and spanning a short distance between one pair of adjacent slots 239, the notch depth being greater than that of the circumferential channel 241. One end of each inking pad bearing shaft 235 is received by each of a plurality of equally spaced circular shaft support openings 245 in the detent wheel 191. These openings are centered on the respective rise portions of the detent wheel between adjacent detent wheel depressions 211. The other end of each inking pad bearing shaft rests in a respective inking pad support disc slot 239, with the shaft groove 237 centered on the support disc peripheral channel 241. A circular spring retainer clip 247 fits into the channel 241, bearing on the inking pad support shaft grooves 237 so as to retain the shafts in place. The free ends of the retainer clip 247 are turned inwardly and rest on the side-walls of the rectangular notch 243. Thus, the inking pads 231 are free to rotate about their respective axes, which are all parallel to the lever rear shaft 187, and all of the pads 231 rotate with the detent wheel 191 about the rear shaft 187. The pads 231 then actually are mounted for epicyclic motion. Individual pads can be removed by simply applying axial pressure on the respective shaft 235, causing the groove 237 to come away from the retainer clip 247.

The print head rear gear 195 meshes with an idler gear 249 which in turn meshes with the print head front gear 179. The idler gear 249 is journaled on a stub shaft 251 which is fixed to and extends inwardly from the inboard side of the long arm 169 of the right hand lever 165. The pitch of the front, idler, and rear gears is made such that the rear gear 195 will make two revolutions for each revolution of the front gear 179. The idler gear 249 causes the front and rear gears to always rotate in the same direction for a purpose to be hereinafter explained.

Bridging between the lower ends of the short arms 167 of the print head bell crank levers 163, 165 and fixed thereto is a support member 253 for a print head actuator roller 255, which is journalled on a stub shaft fixed to and depending from the center of said support member 253.

The print head actuator assembly 33 includes a print head actuator bar 257 of right angle transverse section which is pivotally suspended by a pair of integral support arms 259 extending laterally upward from the bar 257 at its respective ends. The support arms 259 are fixed to respective stub shafts 261 which are journalled on the respective recorder sidewall extensions 59, 61 immediately forward of the rear track 95. The actuator bar 257 is positioned so that one of its sides 263 is disposed generally radially of the pivot axes of the stub shafts while the other side 265 is disposed generally tangentially of the axes of the stub shafts 261. The axes of the stub shafts 261 are aligned and parallel to the print head pivot axis 139. The support arms 259 are of such length that the actuator bar radial side 263 is at the level of the print head actuator roller 255, so that the roller rides on the front surface of the radial side 263 throughout the print head carriage travel. The print head actuator assembly 33 also includes an actuator drive motor 267 having an output shaft 269 to which there is fixed a print head actuator cam 271. The actuator motor 267 is of the synchronous type, incorporating a gear reduction (not shown) chosen so as to rotate the output shaft 269 at a selected constant speed. Also fixed on the output shaft inboard of the actuator cam is a selector advance cam 273 for a purpose to be hereinafter described.

The drive motor 267 is mounted to one side of a recorder interior partition 275 which is fixedly supported on, parallel to, and spaced from the recorder right sidewall. The drive motor shaft extends through the partition 275, so that the cams 271, 273 are disposed on the other side of the portion. The drive motor 267 is mounted so that its output shaft 269 is parallel to the actuator bar 257. Fixed to the underside of the actuator bar 257 tangential side 265 and extending rearwardly therefrom is a stub shaft support bracket 277. Mounted on the outer end of said bracket 277 and extending laterally thereof is a stub shaft 279, upon which there is journalled a print head actuator cam follower roller 281. This cam follower roller rides on the peripheral surface of the print head actuator cam 271. The print head actuator cam is provided with a single peripheral notch 283 having a radial side 285 and a chordal side 287, with the chordal side subtending an angle of seventy two degrees for a purpose to be hereinafter explained. The action of the actuator cam follower roller 281 as it rides on the print head actuator cam 271 governs the forward motion of the actuator bar 257, and hence the upward motion of the print head front shaft 171. When the follower roller 281 is on the cam circumference (not in the notch), the actuator bar 257 is in its full forward position and the front shaft 171 is in its full upward position. Upward movement of the front shaft is exactly limited to this full upward position by means of an adjustable stop screw 289 which is fixed to the carriage main support member 115 and extends downwardly therefrom with its end abutting the upper edge of the long arm 169 of the left hand lever 163 at a point about midway between the front and rear shafts 171, 187. A print head bell crank lever bias spring 290 has a center portion disposed on the print head pivot shaft 139 immediately inboard of the right hand pivot support arm 127, and has one spring arm bearing against the right hand lever short arm forward edge, and another spring arm bearing against the forward edge of the right hand pivot support arm. The bias spring 290 thus serves to urge the lever short arm 167 in the rearward direction, and hence the print head front shaft 171 in the downward direction. The weight of the print head forward of the print head pivot shaft 139, aided by the bias of the spring 290, will cause the front shaft 171 to move downward whenever the actuator cam surface allows the follower roller 281, and hence the actuator bar 257, to move rearward. The cam follower shaft 279 is on approximately the same level as the actuator cam center. When the follower roller 281 is at full dwell position (the deepest portion of the cam notch 283), the print character ring 183 is resting in print position on the print platen 41 (and chart paper 37), and there is a slight clearance between the follower roller 281 and the cam notch chordal side surface 287.

The selector advance cam 273 is provided with a single dwell notch 295 which is located seventy two degrees behind the trailing edge of the printer bar actuator cam chordal surface 287. A selector advance microswitch 297 is mounted on the interior partition 275 beneath the selector advance cam 273 and has an actuator arm 299 mounting a cam follower roller 301 which rides on the peripheral surface of the selector advance cam 273. The selector advance microswitch 297 is a single pole single throw type and is spring biased toward the closed position, being held open when the follower roller 301 is on the cam circumference, but moving to the closed position when the follower roller dwells in the notch 295.

The multichannel printing recorder apparatus as shown by the drawings is capable of handling up to twelve input channels. The inputs may be taken from any suitable input parameter source, the specific nature of which will depend upon the application of the recorder in the particular case. A common type of input source is the thermocouple, and it may be assumed for discussion purposes herein that the recorder is monitoring the outputs of twelve thermocouples. The thermocouple output leads are all connected to the input terminals of a selector mechanism which is capable of selecting and applying the thermocouple outputs in sequential succession to the recorder measuring and printing mechanism.

The selector mechanism may take the form of a multiple deck impulse actuated stepping switch 303 of the type illustrated schematically in FIGURES 9, 12, and 20. The selector mechanism may be either mounted in the recorder case, or it may be located remote from the recorder. In FIGURE 12 there is represented four decks of a stepping switch, the decks being designated A, B, C, D. Each deck has a plurality of terminals with a contact for each terminal, and a traversing contact 305. The stepping switch 303 may have any suitable number of decks, and each deck may have any number of terminals. For purposes of the present invention, each deck may be assumed to have twenty four terminals. The traversing contacts 305, 363, 365, 389 are ganged so as to sweep the deck contacts in unison. The deck and traversing contact arrangement is such that the sweeping operation is continuous, that is, the step from the last contact back to the first contact takes the same time interval as any other contact to contact step. One arrangement providing continuous contact sweeping is illustrated by FIGURE 9, wherein only one of a plurality of similar decks is shown. The deck (A) of FIGURE 9 has its contacts (1–12′) arranged in semicircular fashion, and the traversing contact 305 is actually a pair of common contacts disposed 180 degrees apart, so that when one of the traversing contacts 305 is on the last deck contact (12′), the other traversing contact 305 is open and disposed just one step away from the first deck contact (1).

The manner of actuating the stepping switch traversing contacts 305 may be understood from consideration of the schematic circuit diagram of FIGURE 9. The traversing contacts 305 are fixed to a shaft 307 which is journalled on suitable bearing supports (not shown). Also fixed to the shaft 307 is a ratchet wheel 309 having the same number of teeth (twenty four) as the selector decks have contacts. The ratchet wheel 309 is engaged by a pawl 311 which is pivoted at one end on the armature 313 of a solenoid 315, and is spring biased by suitable means (not shown) so as to maintain proper contact with the teeth of the ratchet wheel 309. The solenoid 315 is powered by direct current voltage supplied at the output terminals 317, 319 of a power supply 321. The power supply has input terminals 323 connected to a suitable alternating current source and in series with the primary winding 325 of a transformer. One power supply output terminal 319 is connected to ground at 327 and in series with a current limiting resistor 329 to one side of the transformer secondary winding 331, the other side of which is connected in series with a rectifier 333 to the other power supply output terminal 317. The rectifier 333 is poled to conduct in the direction toward the output terminal 317. A capacitor 335 is connected across the power supply output terminals 317, 319. The solenoid 315 has a winding 337, one side of which is connected via lead 339 to the grounded power supply output terminal 319, and the other side of which is connected via lead 341 in series with the normally open contact of a single pole, single throw switch 297 (the selector advance microswitch) and via lead 343 in series with the normally closed contact 345 of a single pole double throw switch 205 (the first microswitch hereinbefore mentioned), and via lead 347 to the ungrounded (positive) power supply terminal 317. All of the terminals (1–12′) of the stepping switch deck (A) shown are connected together, with the exception of terminals (1, 1′) and are connected via lead 349 to the normally open contact 351 of the first microswitch 205. A linkage arm 353 is fixed at one end to the solenoid armature 313 and bears at the other end on a compression spring 355. Fixed to move with the linkage arm 353 is a normally closed interrupter contact 357. The traversing contacts 305 of the deck (A) shown are connected via lead 359 in series with the interrupter contact 357 and via lead 361 to the ungrounded side of the solenoid winding 337.

When the solenoid winding 337 is energized, the armature 313 moves in the direction (indicated by the arrow) to retract the pawl 311 so that it moves to the next ratchet wheel tooth, opens the interrupting contact 357, and compress the spring 355. This is the "cocking" action and "cocked" position of the stepping switch 303. Then, when the solenoid 315 is de-energized, the force of the compression spring 355 pushes the solenoid armature 315 in the opposite direction so that the pawl 311 acts on the tooth with which it is engaged to rotate the selector wheel 309, and thus the traversing contacts 305, one step to the next deck contact. This is the "advancing" or "selector advance" action of the stepping switch 303. Actuation of the first microswitch 205 is controlled by the print head cam 173, while actuation of the selector advance microswitch 297 is controlled by the selector advance cam 273. At the instant when the selector advance switch 297 is closed, the solenoid 315 is energized and the stepping switch 303 is "cocked," and it remains so until the instant when the selector advance switch 297 is opened, de-energizing the solenoid coil 337, at which instant the stepping switch 303 advances one step. So long as the first microswitch 205 is in the normal position with its contact 345 closed, the action of the stepping switch 303 is simply to advance one step each time the selector advance switch 297 is opened. However, when the first microswitch 205 is closed on its normally open contact 351, the selector advance switch 297 has no effect, since the solenoid power supply circuit via leads 341, 347 is then open. Now if the traversing contact 305 is on deck contact 1 or 1′, nothing happens because the solenoid power supply circuit via leads 341, 361, 359, and 349 is then open. However, if the traversing contact 305 is on any deck contact other than 1 or 1′, the last mentioned power supply circuit is closed, and the stepping switch 303 will rapidly advance, step by step, until the traversing contact 305 arrives at either deck contact 1 or 1′, at which time it will stop. The continuous rapid advance of the traversing contact 305 is due to the action of the interrupter contact 357, which for each step is momentarily closed for the cocking action and then immediately opened for the advancing action. The relationship of the print head and selector advance cams 173, 273 is always such that the first microswitch 205 is always closed to its contact 351 sufficiently ahead of the selector advance switch 297 to allow plenty of time for the traversing contact 305 to be stepped from any deck contact to the next open deck contact (1 or 1′) before the selector advance switch 297 is closed. Such arrangement insures that the mechanism will never automatically step from deck contact 12 or 12′ through deck contact 1 or 1′ to deck contact 2 or 2′ and onward to result in an intolerable hunting action.

From the foregoing it is apparent that one deck (A) of the stepping switch 303 is utilized for stepping switch control as shown by FIGURE 9. Then two decks (B and C of FIGURE 12) of the stepping switch are used for the recorder input channels. Each input channel is connected to a corresponding pair of terminals on decks B and C, and the traversing contacts 363, 365 for channels B and C are connected to the input terminals (not shown) of the recorder measuring circuit. Thus, in normal operation, the stepping switch 303 will select each input channel in repeated sequential succession and will connect the respective input channel via the traversing contacts 363, 365 to the input terminals of the recorder measuring circuit, causing the recorder to determine, and to print on a moving graphical chart 37 the value of the parameter of the respective selected input channel.

Although the recorder in the embodiment of the present invention shown by the drawings is capable of handling up to twelve input channels, there will be cases where all twelve channels are not required, or where at times it is desired to print only selected ones of the input channels. For this reason there is provided a selective recorder print inhibiting arrangement, which is illustrated by FIGURES 17–20 of the drawings. The print inhibiting arrangement utilizes one deck (D of FIGURE 12) of the stepping switch 303, a bank of single pole single throw print inhibit channel selector switches 367, a solenoid 369, and a recorder print head actuator extension lever 371. The actuator extension lever is fixed to the underside of the print head actuator bar 257 extending downwardly therefrom and adjacent the recorder right hand sidewall 15. The rear face 373 of the extension lever 371 is perpendicular to a plane which passes through the centers of the print head front, rear, and pivot shafts 171, 187, 139, and thus at all times bears a fixed relation to the position of these shafts and the print character ring 183. The solenoid 369 has a body 375, and an armature 377 which extends coaxially of the body and protrudes from one end thereof. The body 375 is fixed to a mounting plate 379 disposed at the end opposite the armature protruding portion 377 and at right angles thereto. The mounting plate 379 is provided with a pair of laterally extending mounting slots 381. The solenoid 369 is fixed to the recorder right hand sidewall 15 below the actuator drive motor 267 and in position such that the extension lever 371 may be intercepted by the armature protrusion 377 when the solenoid is energized. The solenoid armature 377 is spring biased so that the armature is in a retracted position (as shown by solid lines in FIGURE 19) when the solenoid is de-energized, and in an extended position (as shown by dotted lines in FIGURE 19) when the solenoid is energized. The solenoid base plate laterally extending mounting slots 381 are provided so that the solenoid armature position may be adjusted to be closer to or further away from the bearing face 373 of the extension lever 371. In FIGURE 20, one input terminal 383 of a power supply (not shown) is connected in series with the solenoid input terminals 385 and via lead 387 to the traversing contacts 389 of the stepping switch deck (D). The respective pairs of deck contacts corresponding to a single input channel are connected in parallel and via leads 391 to one set of corresponding terminals of the bank of print inhibit channel selector switches 367, the other set of corresponding terminals of said switches being connected together and via lead 393 to the other power supply terminal 395.

The operation of the multichannel printing recorder apparatus of the present invention will now be discussed in some detail. Since the high speed capability of the recorder apparatus is of primary importance, that aspect will receive emphasis throughout the following discussion, both as to specific recorder components, and as to their interrelation in the recorder system. For discussion purposes let it be assumed that the recorder apparatus is completely installed and ready for normal operation, monitoring twelve input channels. Further assume that the apparatus is timed to print one character (the parameter of an input channel) each second, making the cycle time (the time between successive printings of the parameter of any particular channel) twelve seconds. In other words, the parameter of each input channel will be sampled and recorded five times each minute.

Now it is apparent that as the actuator drive motor 267 rotates the print head actuator cam 271, the action of the roller 281 on the cam surface will control the movement of the actuator bar 257, and hence through print head actuator roller 255 and print head bell crank levers 163, 165, will control the movement of the print head front and rear shafts 175, 187 about the print head pivot shaft 139. The motion of the print head front shaft 171 is normally limited in the downward direction by the bearing of a print character 185 on the chart paper 37 supported by the print platen 41, and in the upward direction by the bearing of the end of the adjustable stop screw 289 on the upper edge of a print head bell crank lever long arm 169. The lower limit of the front shaft motion will be herein referred to as the print position, and the upper limit will be referred to as the index position. The print wheel 183 is in the print position when the actuator roller 281 is at full dwell in the notch 283 of the actuator cam 271, and is in the index position when the roller 281 is riding on the circumference of the cam 271. The stop screw 289 is adjusted so that the print head can have no movement about its pivot shaft 139 when the print wheel 183 is in the index position. This position of the stop screw 289 places the front shaft 139 at exactly the proper distance below the pivot shaft 221 of the index locking mechanism bell crank 217 so that the lower extremity of the pawl 219 has forced the ratchet wheel 175 to rotate through the precise proper angle to accurately position the print wheel 183 (and hence a print wheel character 185) in just the right orientation relative to the chart paper 37 and print platen 41 for effective printing when the print wheel moves from the index to the print position.

The motion of the print head front shaft 171 relative to time is illustrated by the upper curve of the graph of FIGURE 8, wherein the time for one complete print head cycle is plotted as abscissa and up and down motion as ordinate. The time, zero, for starting the cycle was arbitrarily selected. From time zero to time 0.2, the front shaft 171 remains in index position. At time 0.2 the roller 281 begins to move off the circumference of the cam 271 and down into the notch 283, arriving at the full dwell position at about time 0.22. Now the front shaft 171 is at the print position, where it remains until about time 0.28, when the roller 281 begins to move up the chordal surface 287 of the notch 283. At time 0.4 the roller 281 has arrived at the upper end of the chordal surface and is again riding on the cam circumference, which means that the front shaft 171 has returned to index position, where it will stay during the remainder of the recorder cycle.

It is apparent from the foregoing that the actuator drive motor 267 drives the actuator cam 271 and consequently also the selector advance cam 273 at the rate of one revolution per second, or 60 revolutions per minute. It is also apparent that the time it takes for the front shaft 171 to move from index position to print position and back to index position is 0.2 second. Further, the print wheel dwell time is about 0.1 second, and the print wheel advance time is about 0.08 second.

The clearance provided between the roller 281 and the cam notch chordal surface 287 at full dwell allows for slight compression of the print character 185 and print platen 41 surfaces so as to obtain a smooth and effective print impression devoid of the blurring or partial printing action that would result from a rigid hammer to anvil type of print character to print platen impact.

The action of the print head locking mechanism during a full recorder cycle will now be considered, with particular reference to FIGURES 5–8 of the drawings. Beginning with the front shaft 171 in index position, as shown in FIGURE 5, the detent 229 is bearing on the rear side of a detent wheel depression 211, and the pawl 219 lower extremity is bearing on the radial surface of a ratchet tooth. This is the index lock position. The ratchet wheel 175 cannot move counterclockwise because of the pawl 219, and the detent wheel 191 cannot move clockwise without the force necessary to cam the detent 229 out of the depression 211 and also camming the pawl 219 outward, and in both cases such camming action is immediately opposed by the tendency to flex the spring leaf detent arm 213, and in the case of the pawl 219, such camming action is also immediately opposed by the compression spring 227. Such undesirable camming force is never present under normal conditions. Since the detent wheel 191 and the ratchet wheel 175 are geared together to rotate in the same direction, opposition of motion of one in a particular direction is also effective opposition to motion of the other in that direction. Thus, the ratchet wheel 175 is effectively locked in the index position and remains so locked during the entire index portion of the recorder cycle.

The index position of the detent 229 during a recorder cycle is shown by the horizontal regions 397 of the lower curve of FIGURE 8. During movement of the front shaft 171 from the index position to the position shown in FIGURE 6 (which is the instant before the pawl moves off the tip of one ratchet wheel tooth) the detent 229 is moved downward as indicated by the region 399 of the lower curve of FIGURE 8 due to the outward movement of the pawl 219, thus following the detent depression 211 to maintain the lock. In the print position, as shown by FIGURE 7, the detent 229 has moved clear of the detent wheel 191, the pawl 219 is resting on a ratchet wheel tooth surface near the surface midpoint, the actuator roller 281 is at the end of its dwell (about time 0.28 in FIGURE 8), and a print character 185 is resting on the chart paper 37. The position of the detent 229 during the print interval is indicated by the flat region 401 of the lower curve of FIGURE 8.

When the ratchet wheel 175 has moved upward on the print wheel advance portion of the cycle sufficiently for the pawl 219 to engage the radial surface of the next tooth, the ratchet wheel 175 and the detent wheel 191 begin to rotate. During the initial portion of the turning action, the detent 229 moves slightly downward as indicated at region 403 of the lower curve of FIGURE 8, because the bell crank 217 is rotated slightly counterclockwise against the pressure of spring 227. Then the detent 229 contacts the leading edge of the approaching detent wheel cam and is moved upward on the cam surface as indicated by the region 405 of the lower curve of FIGURE 8. This upward motion is increasingly resisted by the spring leaf detent arm 213 as indicated by the dotted line 407 of the lower curve of FIGURE 8 which shows the movement of the detent 229 were it not for the camming action of the detent wheel 191. This means that at the instant the detent clears the trailing edge of the detent wheel cam surface, it snaps downward in position to positively stop and lock the detent wheel 191 and ratchet wheel 175 motion at the precise proper print wheel position. This action precludes any possibility of the print character wheel 183 coasting through an index position without being locked, which can be particularly important in high speed operation where the inertia of the print wheel 183 and parts that rotate with it would have a strong tendency to cause movement of the print character 185 past the proper index position.

A further significant feature of the index locking mechanism is the automatic removal of the detent arm 229 from the detent wheel 191 just prior to the advancing of the print wheel 183. This automatic removal of the detent arm instead of overriding it permits the use of higher locking torque and thus more positive stopping of the print wheel, and the parts that rotate with it, at the completion of the advance portion of the recorder cycle, without undue wear on the parts. Further, it should be noticed that the detent arm 229 is arranged to lock on the detent wheel 191 rather than the ratchet wheel 175. One of the advantages of such arrangement is that since the gear ratio of the ratchet wheel to the detent wheel is one to two, any variation in the angular position of the detent wheel will result in only half such variation at the ratchet wheel and print wheel.

Another significant feature of the present invention is the inking pad and print wheel arrangement. There are six inking pads 231, each being mounted for epicyclic motion. On each advance portion of the print cycle the paid shafts 235 rotate about the print head rear shaft 187 through a 60 degree angle, while the print wheel characters 185 move through a 30 degree angle. The pad to print character relation is initially adjusted so that at the index position a print character 185 is bearing in proper relation on a pad 231. Therefore, at the end of each print wheel advance, a new pad is presented to the respective print character. Now there is a slight overlap in the peripheral paths of the pads 231 and the print characters 185 (see FIGURE 21). Since the print head front and rear shafts 171, 187 are geared to rotate in the same direction, then during the advance portion of the print cycle the pad which is in contact with a print character will move downward, while the print character moves upward. During the initial part of the advance, while the pad and print character are still in contact, the pad 231 will be forced by the print character 185 to rotate slightly (a random amount) on its shaft 235. This means that the pad will present a different portion of its surface to the next print character it contacts. Such action not only provides utilization of ink from all around the pad, but also distributes the pad wear, thus increasing both the interval between the required pad changes and the interval between required pad re-inking.

Another significant feature of the present invention is the utilization of print characters made of rubber or a material having similar characteristics. In prior systems, metal print wheels having metal type characters have been used, and these have required a very thick ink in order that sufficient ink would be carried by the print character to make a clear impression. Such thick ink required that the pads be removed from the recorder and immersed in the ink for extended soaking periods after the ink had been heated to reduce its viscosity. Thus, re-inking the pads was a very messy, troublesome, and time consuming operation, the frequency of which would be intolerance in the case of a high speed recorder. However, with the rubber print characters utilized by the present invention, the ink is readily absorbed and consequently a much more fluid ink can be employed and still produce clear print impressions. Such inks are sufficiently fluid that they can be applied to the felt pads by means of an eye dropper, without removing the pads 231 from the print head, with the ink being quickly dispersed throughout the felt pad.

A further significant feature of the present invention is the print head carriage 53, which is carried between two grooved tracks 93, 95, with two fixed rollers 129 running on the major, or front, track 93 and a third roller 131 which is spring biased against the auxiliary, or rear, track 95 and runs on it. With such arrangement, no uncertainty or ambiguity of position is introduced by lack of exact parallelism of the track grooves 99, 105. Such stability insures that for each slidewire contact 151 position, the print character wheel 183 will have a precise corresponding position, and this relationship is always maintained, so that for a given input parameter the print wheel 183 will always assume precisely the same position on the carriage traverse path. In all recorders, but particularly in the case of high speed recorders, it is extremely desirable to be able to readily remove the print head assembly for ease of adjustment, maintenance, and repair, as well as for replacement. The entire print head assembly of the present invention can be readily removed by simply rotating the carriage support member 115 slightly until one of the fixed rollers 129 is clear of its groove 99, lifting that roller until it clears the top surface of the track 93, and then rotating the support member 115 in the opposite direction to clear the other two rollers 129, 131 from their grooves 99, 105, and then just lifting the entire head assembly out. If it is desired to move the print head assembly completely away from the recorder, then the carriage tow cable threads 153, 155 are freed from the assembly, as is the electrical connection to the first mircoswitch 205. This ready removal of the print head assembly is of particular importance in high speed recording, because even with the most advanced design, the tremendous number of operations which the recorder apparatus can perform will inevitably be accompanied by some wear, requiring maintenance. The print head assembly of the present invention has actually been operated successfully for extended periods at speeds as high as two prints per second, which speed will result in more than five millon print operations per month on continuous run basis.

The operation of the input channel to print head synchronizing system of the present invention, with particular reference to the appartus shown by FIGURES 9 and 12 and hereinbefore described, may be further understood when considered in connection with the graph of FIGURE 13. In each curve of FIGURE 13, the base line level indicates one state of operation of the particular item or function, while the upper line level indicates the opposite state. The graph is divided into three groups of recorder operations, the groups being separated by the dotted lines, with each group representing a different synchronizing situation. In each group there is shown one complete recorder cycle plus a part of the next. The first or left hand group represents a situation where the recorder is simply printing two successive channels, for instances, channels 6 and 7 under normal operation conditions. Then starting at time zero and reading from top to bottom, the first or PRINT curve indicates that the print wheel 183 is in print position until about time 0.1, and from time 1.0 to about time 1.1. The second or ADVANCE curve indicates that the print wheel is being advanced from about time 0.1 to time 0.18 and from about time 1.1 to time 1.18. The third or SW297 CLOSED curve indicates that selector advance mirco-switch 297 is closed for a brief interval beginning at about time 0.4 and again at about time 1.4. The fourth or COCK 303 curve indicates that the stepping switch 303 is cocked immediately upon closing of the selector advance switch 297, and the fifth or ADVANCE 303 curve indicates that the stepping switch 303 is advanced immediately upon opening of the selector advance switch 297. The sixth or MEASURE curve indicates that the recorder is measuring except during the instants when the stepping switch 303 is advancing from one channel to the next. The seventh or SW205 CLOSED 351 curve indicates that the first mircoswitch 205 has its contact 351 open during the entire first curve group time shown. Thus, the recorder prints an channel 6, then advances the print wheel 183 to channel 7, then advances the stepping switch 303 to channel 7, then prints on channel 7, then advances the print wheel 183 to channel 8, then advances the stepping switch 303 to channel 8, and so on, printing the channels in sequential succession, and printing each channel once every twelve seconds.

The center group of curves illustrates the synchronizing action when moving from the last channel (12 or 12′) back to the first channel (1 or 1′). The first curve indicates that the print and advance times are the same as before, with the recorder printing on channel 12 (or 12′) beginning at time zero, and then advancing to channel 1 (or 1′) during time 0.1 to 0.18. The advancing of the print wheel 183 from channel 12 (or 12′) to channel 1 (or 1′) moves the print head cam 173 from its non-dwell to its dwell position, where it remains from about time 0.15 to time 1.15, or substantially the time during which the print wheel 183 remains indexed on channel 1 (or 1′). This means that the first microswitch 205 is closed to its contact 351 during the same time interval. The instant contact 351 is closed, the stepping switch 303 cocks itself, and due to action of the interrupting contact 357, immediately advances to the next channel, which is 1 (or 1′), and since these contacts on the selector deck are open, no further stepping action occurs. Now when the selector advance switch 297 closes at about time 0.4, nothing happens because contact 345 is open. The recorder then prints on channel 1 (or 1′) at time 1.0, and advances to channel 2 (or 2′) at time 1.1. Then at time 1.4, when the selector advance switch 297 again closes, the stepping switch 303 cocks and advances to channel 2 (or 2′) in normal fashion, since contact 351 has now opened and contact 345 is again closed.

The third or right hand group of curves illustrates the synchronizing action when the print wheel 183 is out of synchronism with the channel selector 303. For discussion purposes, assume that the print wheel 183 has just been advanced to channel 1, but that the stepping switch 303 is on channel 8′. Since the print wheel 183 is on channel 1, the contact 351 is closed, so that the stepping switch 303 immediately is cocked and advanced very rapidly, as indicated by the closely spaced vertical lines on the fourth and fifth curves of FIGURE 13, until the stepping switch arrives at open contact 1, where it stops. The channel selector (channel contact decks of the stepping switch 303) is now back in synchronism with the print wheel 183, and when the selector advance switch 297 is next closed, nothing happens, since contact 345 is still open. The print wheel 183 then prints channel 1 at time 1, and advances to channel 2 at time 1.1 to 1.18, then when the selector switch 297 is next closed at time 1.4, the stepping switch 303 advances to channel 2 and the subsequent operations again proceed in normal fashion.

In summary, the first group of curves of FIGURE 13 illustrates normal operation of the synchronizing system; the second group of curves illustrates how the stepping switch 303 proceeds from the last channel back to the first while maintaining synchronism; and the third group of curves illustrates how the system checks synchronism each time the print wheel 183 is advanced to the first channel, and acts quickly and positively to move the stepping switch 303 into synchronism with the print wheel 183 in case it is not already so. Since the stepping switch 303 is capable of up to about forty steps per second, it can easily move from the farthest point of non-synchronism and into synchronism while contact 351 is closed.

The operation of the print inhibiting system illustrated particularly by FIGURES 17–20 will now be described. Assume that it is desired to print all channels except 4, 6, and 9. The contacts of the print inhibitor channel selector switch 367 corresponding to channels 4, 6, and 9 of the deck D of the stepping switch 303 are simply closed. Now, when the stepping switch 303 advances to each of channels 4, 6, and 9 the solenoid 369 will be energized, so that its armature 377 is moved to its extended position where it will intercept and limit the motion of the extension lever 371, and hence the print head actuator bar 257, and hence the print head. FIGURE 18 shows the print inhibit condition where the extension lever 371 has been intercepted and bears on the armature 377 so that the print head actuator cam follower roller 281 does not completely dwell on the print head actuator cam 271. The extension lever 371 is allowed sufficient motion so that the print head will index on the inhibited channel and advance on the next, but not enough motion to allow the print wheel character 185 to contact the chart paper 37.

On the channels that are not selected for inhibiting, the solenoid 369 is de-energized so that its armature 377 does not intercept the extension arm 371 (illustrated by FIGURE 17), and the recorder indexes, advances, and prints all in the normal fashion. The print inhibit function may, if desired, be controlled by other than manual switching action. For example, the recorder could be arranged to print only when the signal of a channel to be printed is within a predetermined range of magnitudes, or exceeds, or is less than a predetermined magnitude. This can be accomplished by contacts performing the same function as those of switches 367 controlled by the movement of the print head carriage 53. Thus, the order to print or not print for a particular channel or group of channels may be derived from various sources and predetermined conditions.

The inherent nature of some of the major assemblies of the recorder of the present invention provides the possibility of a unique interrelation resulting in important advantages. For example, consider the interrelation of the print head assembly 53, the channel selector assembly (stepping switch 303, its associated decks A, B, C and circuitry), the timer assembly (actuator drive motor 267, actuator cam 271, and selector advance cam 273, and associated parts), and the print inhibit assembly (selector deck D, solenoid 369, switches 367 or equivalent, and extension lever 271). Now notice that the timer is linked to the print head assembly and to the selector assembly, the print head assembly is linked to the selector assembly, and the print inhibit assembly is linked to the print head assembly intermediate on the timer to print head linkage. In the specific embodiment shown herein, the timer to print head linkage is mechanical (print head actuator cam 271 to print head actuator bar 257); the timer to selector linkage is electromechanical (selector advance cam 273 to selector advance switch 297 to stepping switch 303); the print head to selector linkage is electro-mechanical (print head cam 173 to first microswitch 205 to stepping switch 303); and the print inhibitor to print head linkage is electromechanical (switches 367 or equivalent to solenoid 369 to extension lever 371 to print head actuator bar 257). Now each of the linkages just mentioned functions to transmit instructions or commands. Now it is essential to notice that the nature of the instruction or command required in each case is of a logical or impulse nature, that is to say, the command or instruction is always one or the other of two possibilities, such as yes or no, stop or go, and the like. More specifically, the timer to print head instruction is to either print or advance; the timer to selector instruction is to advance or not advance; the print head to selector instruction is to either advance or not advance; and the print inhibitor to print head instruction is either to print or not print. Now since each linkage carries only logical, or impulse, or one of two positions, type instructions or commands, any number or all of them can be made electromechanical, meaning that the assemblies need not have any definite relationship as to physical location, since the electrical portion of the linkage in each case may include conductors as the only physical link between the assemblies. Thus, the assemblies can be located remotely from each other, and any one of them may be readily replaced without disturbing the funtions of the combination. The possibility of remote location of assemblies is especially important in the miniature recorder case where there is frequently inadequate room for the selector assembly and the multiplicity of connections associated with it. Also, if desired, timer and print head assemblies can be electrically connected to any one of a group of selector switches, permitting selective recording of any set input channels of a multilpicity of such sets. Further, in the changing or replacing of the linked assemblies, no alignment problems are encountered. Further, for example in the case of thermocouple inputs, the possibility of locating a selector assembly at a place far removed from the recorder proper makes it unnecessary to bring the multiplicity of thermocouple leads the considerable distance to the location of the recorder proper.

The foregoing disclosure and the showings made in the drawings are merely illustrative of the principles of this invention and are not to be interpreted in a limiting sense.

We claim:

1. Multichannel high speed printing recorder apparatus comprising: an impulse actuated stepping switch having first, second, and third contact decks, a traversing contact for each said deck adapted for stepping from deck contact to deck contact in repeated sequential succession, a ratchet and pawl mechanism for moving said traversing contacts a step at a time, a solenoid having a coil and an armature, means linking said armature to said pawl, spring biased means urging said armature and said pawl to the advance position when said solenoid coil is deenergized, said pawl being moved to the cock position against said spring bias when said solenoid coil is energized, means connecting corresponding pairs of contacts of said second and third decks to recorder input channels, means connecting said second and third deck traversing contacts to a common recorder input, an interrupter contact arranged to open and close each time said solenoid coil is energized and de-energized, a first single pole single throw switch, a second single pole double throw switch having a first and a second contact, means connecting said solenoid coil in series with said first switch and the first contact of said second switch and a power supply, means connecting all said first deck contacts together, except the contacts corresponding to the first recorder channel which are left open, and in series with the second contact of said second switch to one side of said power supply, and means connecting the traversing contact of said first deck in series with said interrupter contact and said solenoid coil to the other side of said power supply, a recorder print head, means periodically and successively indexing said print head to successive print channel positions, means for momentarily closing said first switch following each indexing action of said print head, and means for opening said second switch first contact and closing said second switch second contact during the time when said print head is indexed on its first recorder channel position.

2. Multichannel high speed printing recorder apparatus comprising:

(*a*) a print head assembly including at least a print character for each recorder channel, means responsive to a respective first logical impulse signal for moving a respective print character into contact with a record chart, and means responsive to a respective second logical impulse signal for moving said print character out of contact with the record chart and advancing a print character corresponding to a next successive recorder channel to index position relative to the record chart;

(*b*) balancing means for moving said print head assembly transversely of the record chart to a respective static position determined by the input signal from a respective information channel;

(*c*) a channel selector assembly including means for sequentially connecting respective recorder information channels to said balancing means, said sequential connecting means including cock means and advance means, with said cock means operative responsive to a third logical impulse signal to place said connecting means in condition for advance, and with said advance means operative responsive to a fourth logical impulse signal to advance said connecting means to the next sequential recorder information channel;

(*d*) a timer including means for generating in timed succession said first, second, third, and fourth logical impulse signals;

(*e*) means for transmitting said first and second logical impulse signals to said print head assembly; and (*f*) means for transmitting said third and fourth logical impulse signals to said selector assembly.

3. Multichannel high speed printing recorder apparatus comprising:

(*a*) a print head assembly including at least a print character for each recorder channel, means responsive to a respective first logical impulse signal for moving a respective print character into contact with a record chart, and means responsive to a respective second logical impulse signal for moving said print character out of contact with the record chart and advancing a print character corresponding to a next successive recorder channel to index position relative to the record chart;

(*b*) balancing means for moving said print head assembly transversely of the record chart to a respective static position determined by the input signal from a respective information channel;

(*c*) a channel selector assembly including means for sequentially connecting respective recorder information channels to said balancing means, said sequential connecting means including cock means and advance means, with said cock means operative responsive to a third logical impulse signal to place said connecting means in condition for advance, and with said advance means operative responsive to a fourth logical impulse signal to advance said connecting means to the next sequential recorder information channel;

(d) a main timer including means for generating in timed succession said first, second, third, and fourth logical impulse signals;

(e) means for transmitting said first and second logical impulse signals to said print head assembly;

(f) means for transmitting said third and fourth logical impulse signals to said selector assembly;

(g) an auxiliary timer;

(h) means actuated by said auxiliary timer for generating one or more respective auxiliary third and fourth logical impulse signals; and (i) means for applying said auxiliary third and fourth logical impulse signals in said selector assembly to produce repetitions of the same action therein as produced by said third and fourth signals.

4. The invention in accordance with claim 3, wherein said auxiliary timer is mounted on said print head assembly.

5. Multichannel high speed printing recorder apparatus comprising:

(a) a print head assembly including at least a print character for each recorder channel, means responsive to a respective first logical impulse signal for moving a respective print character into contact with a record chart, and means responsive to a respective second logical impulse signal for moving said print character out of contact with the record chart and advancing a print character corresponding to a next successive recorder channel to index position relative to the record chart;

(b) balancing means for moving said print head assembly transversely of the record chart to a respective static position determined by the input signal from a respective information channel;

(c) a channel selector assembly including means for sequentially connecting respective recorder information channels to said balancing means, said sequential connecting means including cock means and advance means, with said cock means operative responsive to a third logical impulse signal to place said connecting means in condition for advance, and with said advance means operative responsive to a fourth logical impulse signal to advance said connecting means to the next sequential recorder information channel;

(d) a main timer including means for generating in timed succession said first, second, third, and fourth logical impulse signals;

(e) means for transmitting said first and second logical impulse signals to said print head assembly;

(f) means for transmitting said third and fourth logical impulse signals to said selector assembly;

(g) an auxiliary timer;

(h) means actuated by said auxiliary timer for generating one or more respective auxiliary third and fourth logical impulse signals;

(i) means for applying said auxiliary third and fourth logical impulse signals in said selector assembly to produce repetitions of the same action therein as produced by said third and fourth signals; and (j) means for disabling said transmitting means for said third and fourth signals while said auxiliary third and fourth signals are being applied.

6. Multichannel high speed printing recorder apparatus comprising:

(a) a print head assembly including at least a print character for each recorder channel, means responsive to a respective first logical impulse signal for moving a respective print character into contact with a record chart, and means responsive to a respective second logical impulse signal for moving said print character out of contact with the record chart and advancing a print character corresponding to a next successive recorder channel to index position relative to the record chart;

(b) balancing means for moving said print head assembly transversely of the record chart to a respective static position determined by the input signal from a respective information channel;

(c) a channel selector assembly including means for sequentially connecting respective recorder information channels to said balancing means, said sequential connecting means including cock means and advance means, with said cock means operative responsive to a third logical impulse signal to place said connecting means in condition for advance, and with said advance means operative responsive to a fourth logical impulse signal to advance said connecting means to the next sequential recorder information channel;

(d) a main timer including means for generating in timed succession said first, second, third, and fourth logical impulse signals;

(e) means for transmitting said first and second logical impulse signals to said print head assembly;

(f) means for transmitting said third and fourth logical impulse signals to said selector assembly;

(g) an auxiliary timer;

(h) means actuated by said auxiliary timer for generating one or more respective auxiliary third and fourth logical impulse signals;

(i) means for applying said auxiliary third and fourth logical impulse signals in said selector assembly to produce repetitions of the same action therein as produced by said third and fourth signals; and (j) means for selectively interrupting the transmission of said first logical impulse signals.

7. Multichannel high speed printing recorder apparatus comprising:

(a) a print head assembly including at least a print character for each recorder channel, means responsive to a respective first logical impulse signal for moving a respective print character into contact with a record chart, and means responsive to a respective second logical impulse signal for moving said print character out of contact with the record chart and advancing a print character corresponding to a next successive recorder channel to index position relative to the record chart;

(b) balancing means for moving said print head assembly transversely of the record chart to a respective static position determined by the input signal from a respective information channel;

(c) a channel selector assembly including means for sequentially connecting respective recorder information channels to said balancing means, said sequential connecting means including cock means and advance means, with said cock means operative responsive to a third logical impulse signal to place said connecting means in condition for advance, and with said advance means operative responsive to a fourth logical impulse signal to advance said connecting means to the next sequential recorder information channel;

(d) a main timer including means for generating in timed succession said first, second, third, and fourth logical impulse signals;

(e) means for transmitting said first and second logical impulse signals to said print head assembly;

(f) means for transmitting said third and fourth logical impulse signals to said selector assembly;

(g) an auxiliary timer;

(h) means actuated by said auxiliary timer for generating one or more respective auxiliary third and fourth logical impulse signals;

(i) means for applying said auxiliary third and fourth logical impulse signals in said selector assembly to produce repetitions of the same action therein as produced by said third and fourth signals;

(j) means for disabling said transmitting means for said third and fourth signals while said auxiliary third and fourth signals are being applied; and (k) means for selectively interrupting the transmission of said first logical impulse signals.

8. The invention in accordance with claim 6, wherein said auxiliary timer is mounted on said print head assembly.

9. The invention in accordance with claim 7, wherein said auxiliary timer is mounted on said print head assembly.

10. Multichannel high speed printing recorder apparatus comprising:

(a) a print head assembly including at least a print character for each recorder channel, means responsive to a respective first logical impulse signal for moving a respective print character into contact with a record chart, and means responsive to a respective second logical impulse signal for moving said print character out of contact with the record chart and advancing a print character corresponding to a next successive recorder channel to index position relative to the record chart;

(b) balancing means for moving said print head assembly transversely of the record chart to a respective static position determined by the input signal from a respective information channel;

(c) a channel selector assembly including means responsive to third and fourth logical impulse signals for sequentially connecting respective recorder information channels to said balancing means;

(d) a main timer including means for generating in timed succession said first, second, third, and fourth logical impulse signals;

(e) means for transmitting said first and second logical impulse signals to said print head assembly;

(f) means for transmitting said third and fourth logical impulse signals to said selector assembly;

(g) an auxiliary timer;

(h) means actuated by said auxiliary timer for generating one or more respective auxiliary third and fourth logical impulse signals; and (i) means for applying said auxiliary third and fourth logical impulse signals in said selector assembly to produce repetitions of the same action therein as produced by said third and fourth signals.

11. Multichannel high speed printing recorder apparatus comprising:

(a) a print head assembly including at least a print character for each recorder channel and print head actuator means to cause said print head to move a respective print character into contact with a record chart and then to move said print character out of contact with the record chart and advance a print character corresponding to a next successive recorder channel to index position relative to the record chart;

(b) balancing means for moving said print head assembly transversely of the record chart to a respective static position determined by the input signal from a respective information channel;

(c) a channel selector assembly including means for sequentially connecting respective recorder information channels to said balancing means, said sequential connecting means including a cock means and an advance means, with said cock means operative to place said connecting means in condition for advance, and with said advance means operative to advance said connecting means to the next sequential recorder information channel;

(d) a timer motor;

(e) a first cam driven by said motor and operatively linked to said print head actuator means to cause same to periodically perform its functions;

(f) a first electric contact means connected to said selector assembly and having a first operative position to cause said sequential connecting means to cock and a second operative position to cause said sequential connecting means to advance;

(g) a second cam driven by said motor and operatively linked to said first contact means to cause same to periodically move to its first and then to its second respective operative position;

(h) a second electric contact means connected to said selector assembly and having an operative position to disable the circuit of said first contact means and cause said selector to cock and advance until it is synchronized with said print head; and (i) a third cam mounted on said print head for movement with said print characters and operatively linked to said second contact means to cause same to periodically move to its said operative position.

12. Multichannel high speed printing recorder apparatus comprising:

(a) a print head assembly including at least a print character for each recorder channel, means responsive to a respective first logical impulse signal for moving a respective print character into contact with a record chart, and means responsive to a respective second logical impulse signal for moving said print character out of contact with the record chart and advancing a print character corresponding to a next successive recorder channel to index position relative to the record chart;

(b) balancing means for moving said print head assembly transversely of the record chart to a respective static position determined by the input signal from a respective information channel;

(c) a channel selector assembly including means for sequentially connecting respective recorder in formation channels to said balancing means, said sequential connecting means including cock means and advance means, with said cock means operative responsive to a third logical impulse signal to place said connecting means in condition for advance, and with said advance means operative responsive to a fourth logical impulse signal to advance said connecting means to the next sequential recorder information channel;

(d) a main timer including means for generating in timed succession said first, second, third and fourth logical impulse signals;

(e) means for transmitting said first and second logical impulse signals to said print head assembly;

(f) means for transmitting said third and fourth logical impulse signals to said selector assembly;

(g) an auxiliary timer;

(h) means actuated by said auxiliary timer for generating one or more respective auxiliary third and fourth logical impulse signals;

(i) means for applying said auxiliary third and fourth logical impulse signals in said selector assembly to produce repetitions of the same action therein as produced by said third and fourth signals; and (j) manually preset means for interrupting the transmission of said first logical impulse signals for selected recorder channels.

13. Multichannel high speed printing recorder apparatus comprising:

(a) a print head assembly including at least a print character for each recorder channel, means responsive to a respective first logical impulse signal for moving a respective print character into contact with a record chart, and means responsive to a respective second logical impulse signal for moving said print character out of contact with the record chart and advancing a print character corresponding to a next successive recorder channel to index position relative to the record chart;

(b) balancing means for moving said print head assembly transversely of the record chart to a respective static position determined by the input signal from a respective information channel;

(*c*) a channel selector assembly including means for sequentially connecting respective recorder information channels to said balancing means, said sequential connecting means including cock means and advance means, with said cock means operative responsive to a third logical impulse signal to place said connecting means in condition for advance, and with said advance means operative responsive to a fourth logical impulse signal to advance said connecting means to the next sequential recorder information channel;

(*d*) a main timer including means for generating in timed succession said first, second, third, and fourth logical impulse signals;

(*e*) means for transmitting said first and second logical impulse signals to said print head assembly;

(*f*) means for transmitting said third and fourth logical impulse signals to said selector assembly;

(*g*) an auxiliary timer;

(*h*) means actuated by said auxiliary timer for generating one or more respective auxiliary third and fourth logical impulse signals;

(*i*) means for applying said auxiliary third and fourth logical impulse signals in said selector assembly to produce repetitions of the same action therein as produced by said third and fourth signals; and (*j*) means for interrupting the transmission of said first logical impulse signals responsive to the magnitude of a signal from a selected source.

14. Multichannel high speed printing recorder apparatus comprising:

(*a*) a print head mechanism including a print character wheel having at least a print character for each recorder channel, said print characters being adapted for recording information on a record chart;

(*b*) balancing means for moving said print head mechanism transversely of the record chart to a respective static position determined by the input signal from a respective information channel;

(*c*) a stepping switch for sequentially connecting respective recorder input information channels to said balancing means;

(*d*) means for periodically advancing said print wheel to the next recorder channel print position;

(*e*) means normally advancing said stepping switch to a corresponding next input information channel following each print wheel advancing operation; and (*f*) means disabling said normal stepping switch advancing means once each recorder cycle and advancing said stepping switch as necessary to bring it into synchronism with said print character wheel.

15. The invention in accordance with claim 14, wherein said disabling and advancing means is actuated by a cam moving with said print character wheel.

References Cited in the file of this patent

UNITED STATES PATENTS

| | | |
|---|---|---|
| 2,006,364 | Morse | July 2, 1935 |
| 2,014,095 | Wood | Sept. 10, 1935 |
| 2,027,945 | Widmer | Jan. 14, 1936 |
| 2,125,345 | Hunt | Aug. 2, 1938 |
| 2,191,673 | Moore | Feb. 27, 1940 |
| 2,328,664 | Moore | Sept. 7, 1943 |
| 2,542,475 | Caldwell | Feb. 20, 1951 |
| 2,579,831 | Keinath | Dec. 25, 1951 |
| 2,628,149 | Blakeslee | Feb. 10, 1953 |
| 2,754,170 | Felton | July 10, 1956 |
| 2,778,710 | Komas | Jan. 22, 1957 |
| 2,791,481 | Jordan | May 7, 1957 |
| 2,793,094 | Bergson | May 21, 1957 |
| 2,803,515 | Begun et al. | Aug. 20, 1957 |
| 2,899,258 | Spracklen | Aug. 11, 1959 |
| 2,911,278 | Haigler | Nov. 3, 1959 |
| 2,918,654 | Hillyer | Dec. 22, 1959 |
| 2,963,336 | Chambers et al. | Dec. 6, 1960 |
| 2,986,722 | Williams | May 30, 1961 |
| 2,993,741 | Maltby et al. | July 25, 1961 |
| 3,034,125 | Gonzenbach | May 8, 1962 |
| 3,047,836 | Johnson et al. | July 31, 1962 |
| 3,058,111 | Duncombe et al. | Oct. 9, 1962 |
| 3,072,910 | Snyder | Jan. 8, 1963 |